Oct. 11, 1966  H. G. HUMMEL  3,278,680

CAMERA SYSTEM FOR RECORDING AIRCRAFT LANDINGS

Filed June 5, 1963  7 Sheets-Sheet 1

HAROLD G. HUMMEL
INVENTOR.

BY Robert G. Clay
ATTORNEY

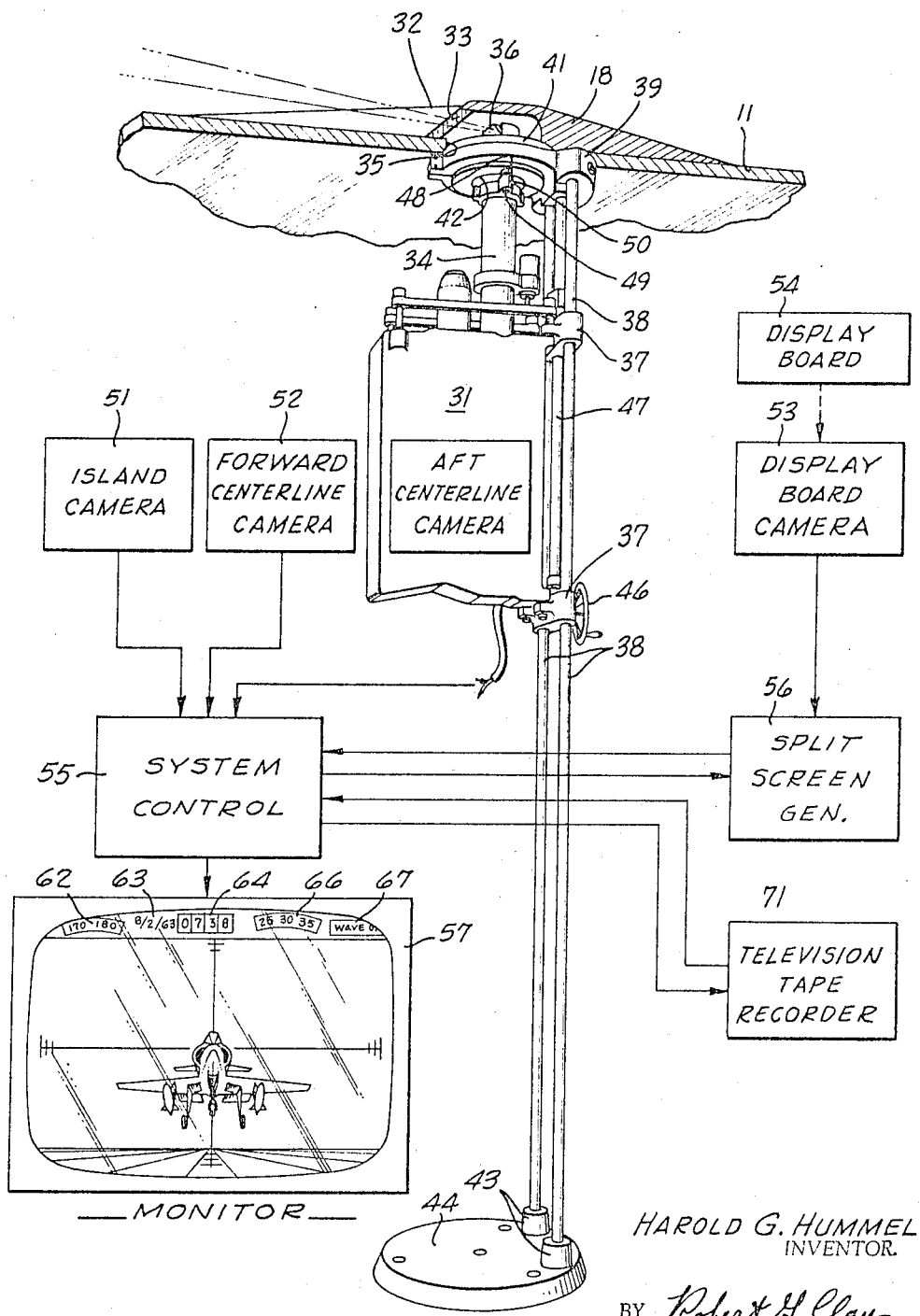

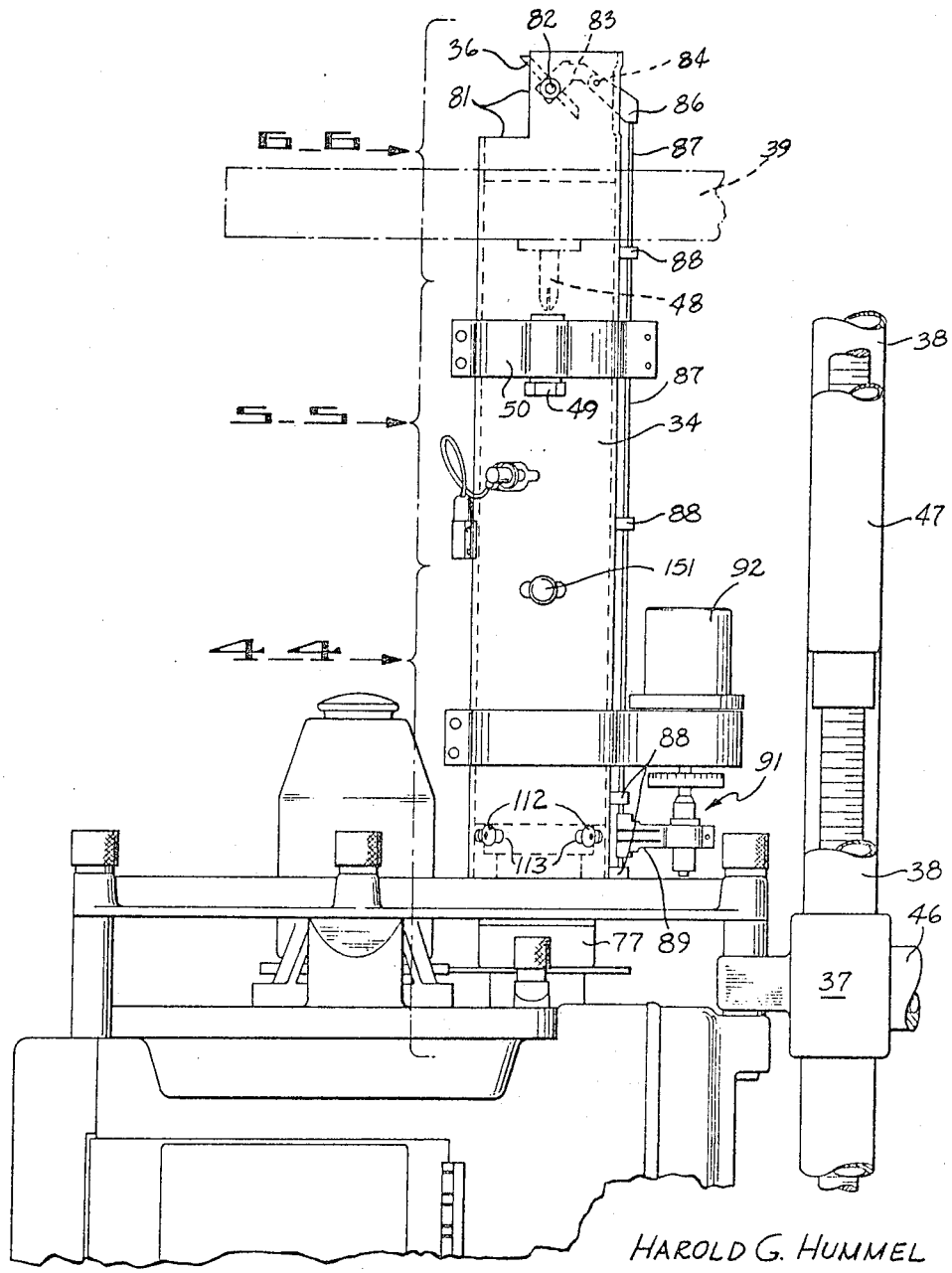
FIG_3

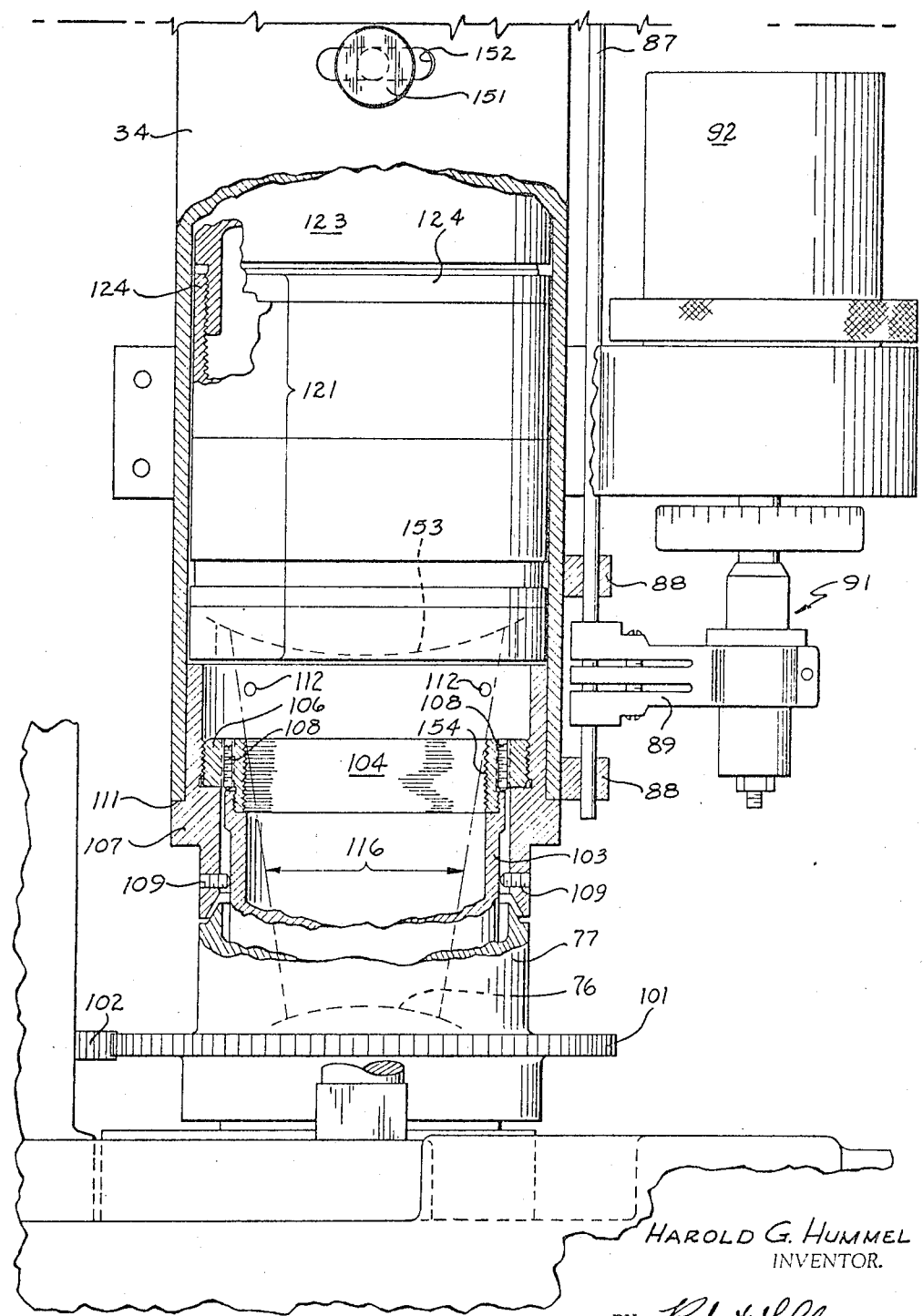

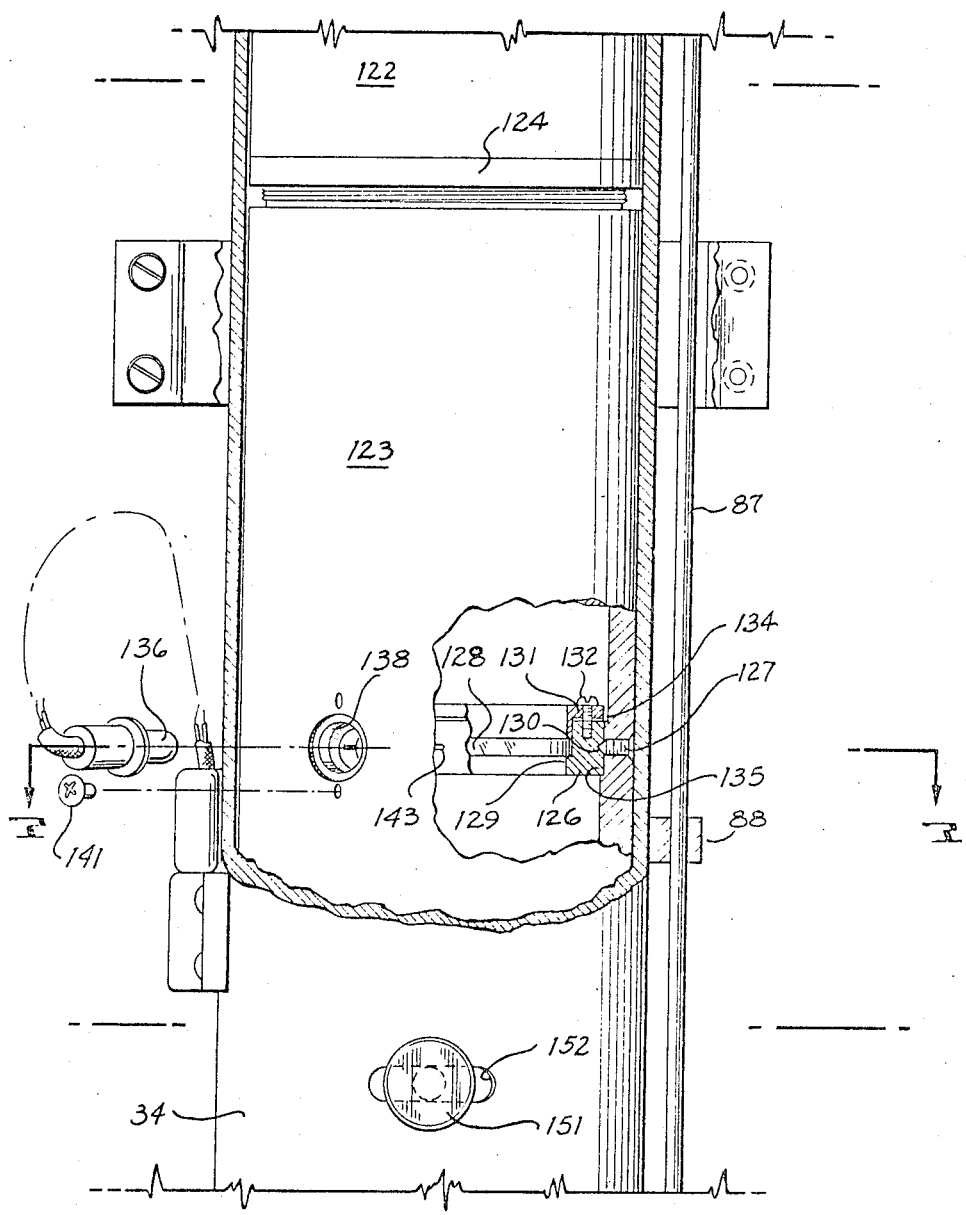

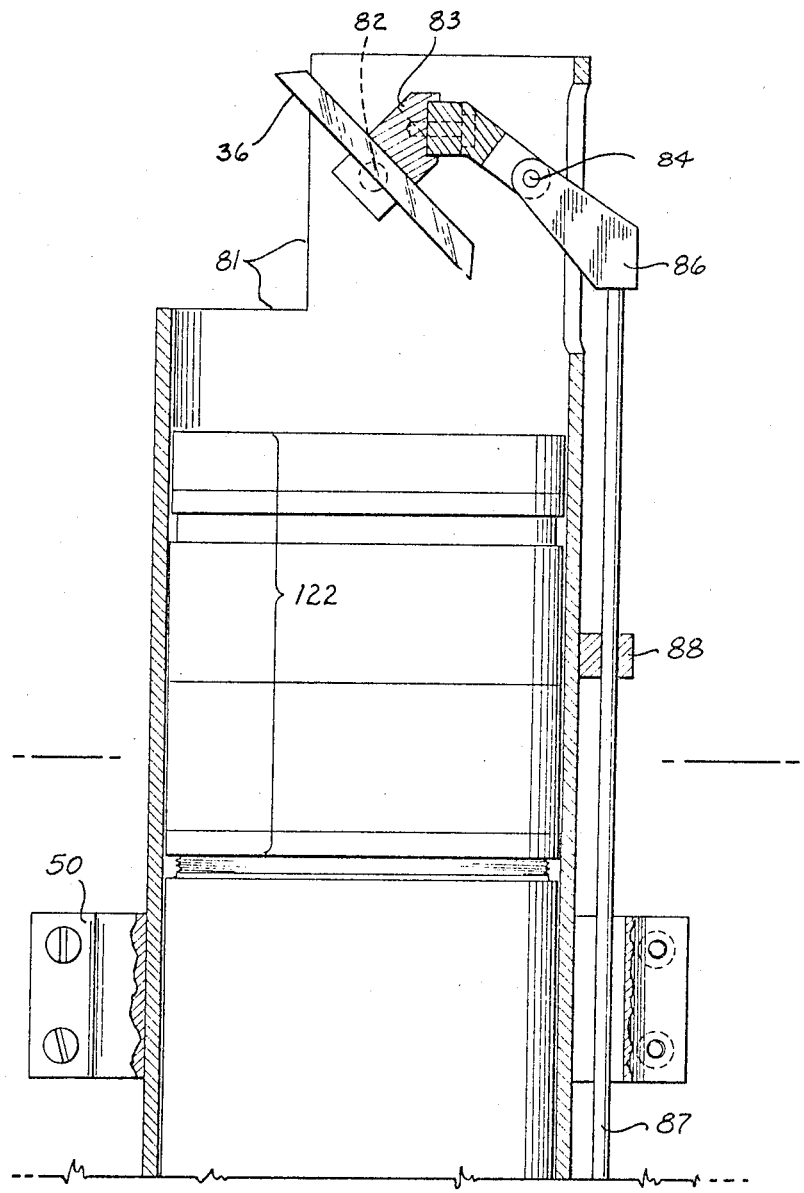

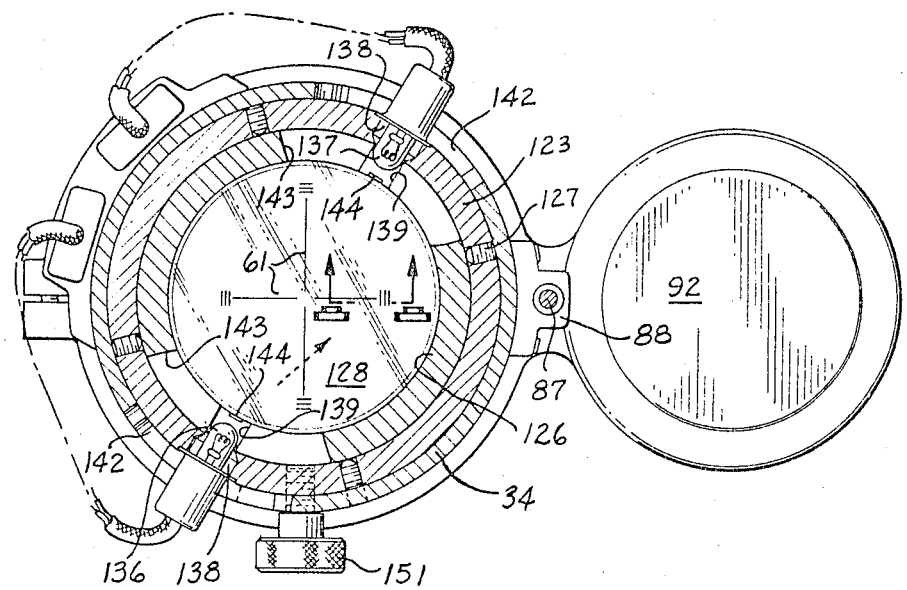
FIG_7
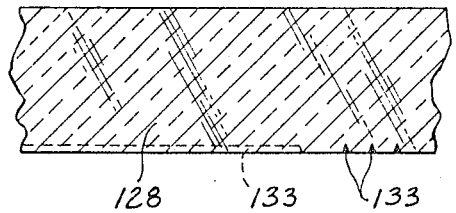
FIG_8

United States Patent Office 3,278,680
Patented Oct. 11, 1966

3,278,680
CAMERA SYSTEM FOR RECORDING
AIRCRAFT LANDINGS
Harold G. Hummel, Santa Clara, Calif., assignor to Ampex Corporation, Redwood City, Calif., a corporation of California
Filed June 5, 1963, Ser. No. 285,823
20 Claims. (Cl. 178—6.8)

This invention relates to aircraft landing systems and particularly to such systems adapted for practice and training of pilots in landing.

In the art of guiding aircraft to a landing, a major effort is spent in attempting to keep the aircraft to a predetermined approach angle. This approach angle is measured in a vertical plane and is the angle made by the path of the aircraft to the plane of the horizontal. Heretofore there has been no satisfactory way of determining from the ground, or from the deck of a carrier, whether or not an aircraft is approaching at a correct angle, partly because to place an instrument in position to measure such an angle has meant placing the instrument directly in the path of the aircraft, endangering both.

Also, in the carrier landing art, it is essential to approach at a correct horizontal angle, which is usually difficult because the landing strip is laid out at an angle to the keel and to the direction of motion of the carrier.

After an incorrect approach, it is often difficult to make a convincing and instructive criticism to the pilot.

After an approach terminating in a crash, it is often difficult to determine the cause.

Accordingly, it is an object of the present invention to provide apparatus for remotely monitoring the flight of an aircraft toward a landing surface, and particularly for measuring the approach angle of the aircraft from a point on the path thereof.

It is another object of this invention to provide apparatus as above described and adapted for making a permanent visible and audible record of the landing and of ambient weather and other conditions.

Apparatus constructed in accordance with the invention includes a camera mounted beneath the aircraft landing surface, e.g. the deck of a carrier, the camera being trained on a mirror that is mounted in an opening of the deck and is protected by a hood or "hat." The hat projects only a few inches above the deck and is shaped to cause the least possible obstruction to the wheels of an aircraft. The mirror is continuously adjusted for tilt in response to signals from the ship's gyroscope, so as to maintain a pair of cross-hairs trained aft at the correct approach and landing angle despite pitch and roll of the ship. A unit magnification optical system is provided to bridge the gap between the mirror and the camera lens so as to avoid tunnel-view effects and to make fullest use of the field of view available. The cross-hairs are illuminable for night use and are positioned within the optical system so as to be permanently in focus at infinity. In a preferred version, the camera is a television camera connected to a monitor screen and to a television tape recorder, the latter for making a permanent record of the landing. Controls are provided for recording the views from several different cameras, including one trained on a board displaying contemporary weather and other information. In addition, the voices of the pilot and landing crew members may be recorded.

A better understanding of the invention may be had by reference to the following description, taken in conjunction with the accompanying drawings, in which:

FIGURE 2 is an enlarged perspective section taken along the plane of lines 2—2 of FIGURE 1, and showing portions of the system in schematic form;

FIGURE 3 is an enlarged elevation of a portion of the apparatus shown in FIGURE 2;

FIGURE 4 is an enlarged broken-away elevation of the portion designated by bracket 4—4 of FIGURE 3;

FIGURE 5 is an enlarged broken-away elevation of the portion designated by bracket 5—5 of FIGURE 3;

FIGURE 6 is an enlarged sectional elevation of the portion designated by bracket 6—6 of FIGURE 3;

FIGURE 7 is a cross-section taken along the plane of lines 7—7 of FIGURE 5; and

FIGURE 8 is an enlarged section taken along the plane of line 8—8 of FIGURE 7.

Figure 1:
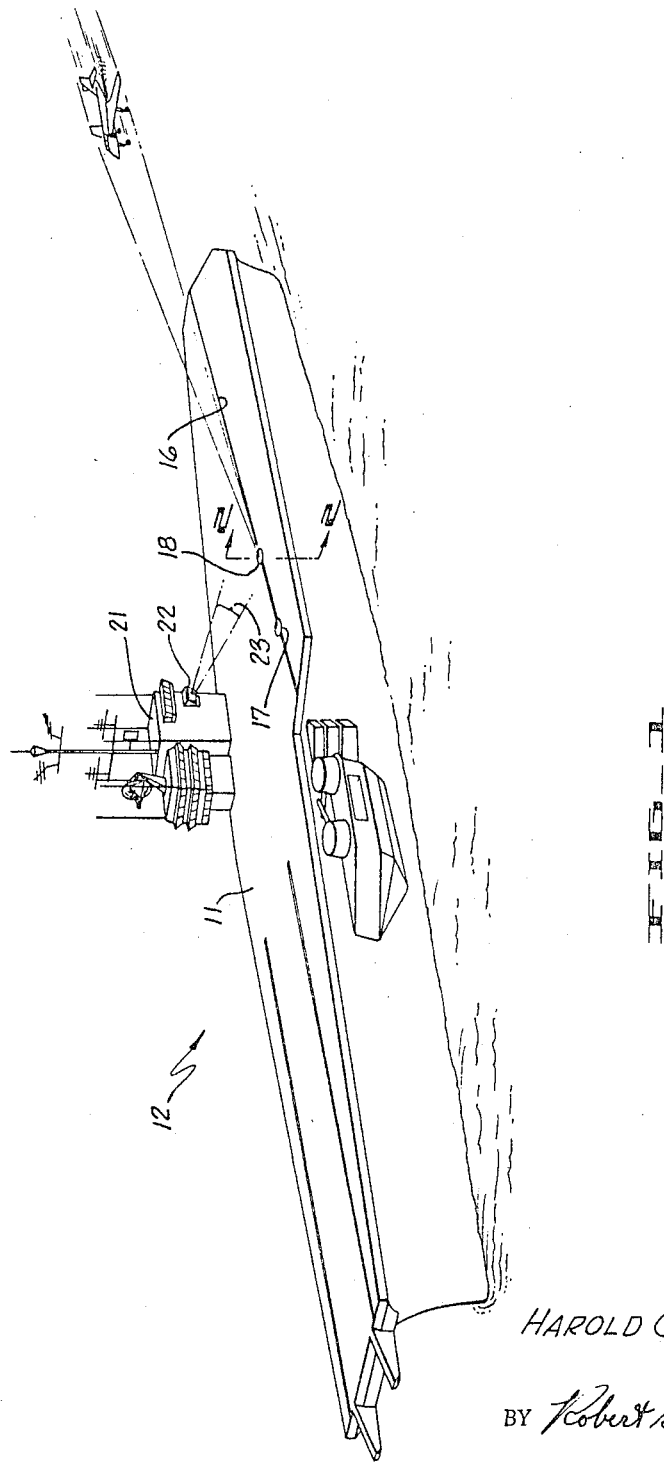
FIGURE 1 is a perspective of an aircraft carrier mounting the apparatus of the invention.

Referring now to the drawings and particularly to FIGURE 1 thereof there is shown an aircraft landing surface comprising a landing deck 11 of an aircraft carrier 12. The carrier is represented as sailing in a forward direction as indicated by the arrow 13, and an aircraft 14 is shown making a landing approach from aft and in line with the center line 16 of the landing strip. As is well known in the carrier landing art, the center line 16 is laid out at an angle to the longitudinal axis or keel of the carrier and to the direction of motion 13, so that in the event that the aircraft's landing hooks (not shown) fail to engage the arresting wires (not shown) on the deck of the carrier, the plane can take off again without traversing the forward portion of the deck on which normally there would be a number of aircraft stored. In order to monitor the approach of the aircraft, and particularly to make sure that the aircraft is approaching at the correct vertical and horizontal approach angles, a pair of television cameras are positioned beneath the deck and are mounted so as to be able to view the aircraft from a corresponding pair of hood-like hats or protected viewing slits 17 and 18 located on the center line 16. The camera mounted at the hat 17 is referred to as the "forward center line camera," and the camera mounted at the hat 18 is referred to as the "aft center line camera." The solid angle occupied by the aircraft in the field of view of the aft center line camera is represented by the lines 19. A third television camera is mounted on the second level of the carrier island 21 and views the side of the aircraft during landing from a port 22 as indicated by the lines 23. This camera may be manned by an operator and is referred to as the "island camera" with the purpose being to follow the aircrafts to make a record identifying the aircraft by its number during the landing, to record which of the arresting wires is hooked, and to record a side view of any unusual happenings that may take place.

Referring now to FIGURE 2, the aft center line camera 31 is shown with its mounting in relation to the hat 18. The forward and aft centerline cameras and their mountings are substantially identical, and only the aft camera is here described in detail. The hat is a sturdy massive hoodlike projection mounted above the deck 11 and having very gently sloping sides so as to cause the least possible disturbance to the wheels of an aircraft rolling over it. Facing in an aft direction is an opening 32 covered by the transparent window 33. It is of particular importance to note that the projection of the hat above the surface of the deck is strictly limited for safety reasons. Within the allowable safety limits there is not enough room for mounting the comparatively large camera 31 with its lens trained directly through the opening 32. Accordingly, the camera is mounted so that the lens thereof is trained directly upward through a tube 34 and toward a hole 35 in the deck beneath the hat 18, and views the approaching aircraft by reflection from an angled mirror 36. The camera is mounted as by means of sliding brackets 37 on a pair of vertical rods 38, the rods being suspended from a bracket 39 that is secured to a heavy boss 41 that is welded to the underside of the deck 11. The boss 41 has a central opening 42 to pass the view from the mirror 46. The lower ends of the rods 38 are mounted for vertical sliding movement in a pair of bearings 43 extending from a plate 44 that is secured to the under deck (not shown). Thus, the normal vertical movement and bending of the upper deck 11 as an aircraft passes overhead is allowed for, and thrust weight is not placed upon the rods 38. The camera 31 is lowered from and raised to the illustrated operating position as by means of a hand wheel 46 that operates a worm gear 47 extending from the bracket 39. For guiding the tube 34 and stopping it in a correct position, a pair of pins 48 extend downwardly from the bracket 39 and fit into a pair of bores 49 formed in a collar 50 that is mounted on the tube 34.

Also schematically illustrated in FIGURE 2 is the system incorporating the cameras, including the island and forward center line cameras 51 and 52 respectively, previously mentioned, and a display board camera 53, which is trained upon a display board 54. Upon the display board is continuously posted numerical weather and other information for permanent recording. The island and two center line cameras are coupled to a system control unit 55. It will be understood that all three of these cameras are continuously operating during a landing, and the system control is used to select the signal from one or another of the cameras for permanent recording. The selected signal however, is first fed to a split screen generator 56, to which is also coupled the display board camera 53, and a composite picture is generated that includes a top portion showing the display from the display board camera and a bottom portion showing the line from the selected island or center line camera, the composite picture being fed back to the system control and thence to a monitor television scope 57 for visual display shown by way of example on the monitor 57 in the FIGURE shows the view recorded by the aft center line camera, of the aircraft in its relation to a pair of crosshairs 61 that are permanently trained at the correct vertical and horizontal approach angles as will later be explained, together with the display board information including aircraft approach speed 62, date 63, time 64, wind velocity 66, and "waveoff signal" 67. The display panels thus shown are either permanently posted or are connected to various measuring instruments, so that as conditions change from moment to moment, the changing values are permanently recorded along with the actual picture of the aircraft in its relation to the approach angle crosshairs 61. Such recording is effected by means of a television tape recorder 71, which may be used at a later time for replaying the entire landing sequence through the system control 54 and monitor 57. Thus, convincing and informative critiques may be held immediately for analyzing the performance of each pilot; and in the event that a landing terminates in a crash, a record is available for later investigation.

Each of the island and center line cameras 51, 52 and 31 may have a separate monitor tube (not shown), coupled directly thereto, these monitor tubes being assembled in a single location for the use of a control officer, who operates the system control 55, and who thus makes the selection from time to time of which view is to be permanently recorded and displayed on the monitor 57. Furthermore, various audio signals, including the voices of the pilot, the landing officers, and a subsequently dubbed voice commentary, may all be recorded on the tape of the recorder 71.

The use of two centerline cameras provides duplicate information, and insures that a record will be made even if one of the cameras fails. The horizontal hair lines of both of the centerline cameras are trained at the same angle to the horizontal (e.g. four degrees), which is the "guide angle" at which the aircraft approaches the deck. While airborne, the pilot is guided by an optical landing system (not here described) and follows a path that intersects the deck approximately at the forward centerline camera. The solid angle defined by the aircraft is, however, sufficiently great that the aircraft image covers the horizontal hairlines of both cameras. This path is followed by the aircraft until the landing hook, which dangles ten or twelve feet below the aircraft, engages one of the arresting wires aft of the aft centerline camera. The aircraft is then drawn directly and forcibly to the deck, and the image of the aircraft drops suddenly below the horizontal hairlines of both the centerline cameras.

The manner in which the tube 34 together with the hairlines 61 and camera are continuously trained at the correct vertical angle despite pitching and rolling of the ship is illustrated in FIGURES 3-6. It should be noted that the actual view-receiving lens 76 of the camera (FIGURE 4) is mounted within a tubular protecting wall 77, and that because of various obstructions (not shown) directly beneath the deck of the carrier, the camera cannot be positioned with the lens 76 closer than about eighteen inches from the underside of the deck 11. Consequently the tube 34 is mounted on the camera to support the mirror 36 at the correct distance from the camera and at the correct position in the hat 18, the assembly being conveniently movable upward and downward along with the camera itself for ease of cleaning, adjusting and repairing. As shown in FIGURE 3, the tube 34 has a cutaway portion 81 at the upper end and facing aft, the mirror being mounted on a pivot pin 82 for pivoting motion between the two side walls of the tube 34, so that the mirror is positioned approximately at a 45 degree angle, downward and aft. For tilting the mirror, an arm 83 is rigidly secured to the mirror 36, and the other end of the arm 83 is pivoted as by pin 84 to an extension 86 of a long and somewhat flexible control rod 87 that extends down the outside length of the tube 34 and is mounted thereon for vertical sliding motion as by brackets 88. Thus as arm 87 moves up or down, the mirror is pivoted, with the upper end of the rod 87 bending slightly to accommodate the differences in the length of the linkage represented by the arm 83 and extension 86. The lower end of the arm 87 is coupled by means of a bracket 89 to a worm gear 91 for controlling the angular tilt of the mirror 36. The worm gear 91 is driven by a servo motor 82 to which is fed signals from the ship's gyroscope, so that the mirror 36 is maintained at such an angle that the view reflected downward through the tube 34 to the camera lens is perpetually the same vertical sector of the horizon and sky even though the ship may be pitching and tilting the tube 34 and camera.

The manner in which the tube 34 is mounted on the camera is illustrated in FIGURE 4. As previously mentioned, a tubular projecting wall 77 surrounds the lens 76 of the camera, but this protecting wall cannot be used to mount the tube 34 because the wall rotates in conjunction with an integral toothed gear 101, which is driven by a drive gear 102 to operate the iris of the camera lens and to vary the diameter of the aperture in a manner well known in the art. The lens mechanism illustrated is in fact a portion of a Taylor-Hobson Ortal lens in common use on television cameras. To serve as a solid mount for the tube 34 however, a tubular element 103 is solidly mounted on a nonrotating interior portion of the Taylor-Hobson lens mechanism, within the periphery of the protecting wall 77 and extending in an axial direction above the open end of the wall 77. The member 103 has an interior thread at the extending end, into which is threaded a ring member 104 having an exteriorly threaded and axially outwardly extending peripheral flange 106 upon which is threaded on outer sleeve member 107. A number of set screws 108 are threaded in an axial direction through the flange 106 to bear against the end of the member 103 for the purpose of precisely setting the axial position of the ring member 104 and for locking the ring member in a precise position during the process of adjusting the optical system of the tube 34, later to be described. Another group of set screws 109 is threaded in a radial direction through the sleeve 107 to bear against the mounting member 103 for the purpose of adjusting and establishing the axial alignment of the optical system of the tube 34, later to be described. The tube 34 is then mounted on the exterior of the sleeve 107, with the lower end bearing against and supported by a peripheral flange 111 extending from the sleeve. The tube 34 is arranged to rotate with respect to the sleeve 107 for the purpose of altering and adjusting the azimuth or horizontal direction of view of the mirror 36 at the other end of the tube, and is secured and can be locked in any selected rotational position as by means of bolts 112 (see also FIGURE 3) passing radially through a group of circumferentially elongated slots 113 in the tube 34 and threaded into the sleeve 107.

In the employment of the tube 34 to bridge the unavoidable gap that must be left between the lens 76 of the camera and the deck and mirror 36, a difficulty arises in that the solid angle of view 116 of the camera lens is sufficiently great to cause a "tunnel" view of the mirror and interior wall of the tube. In other words, the picture shown by the camera would have a very large block peripheral portion representing the interior wall of the tube 34, surrounding a comparatively small circular field that represents the view from the mirror 36. Thus, a very large part of the advantage of the camera lens would be wasted. One way to avoid this wastage would be to use a much larger mirror, but this alternative entails the use of a much higher and more projecting hat 18 and a much larger opening 32 in the hat. As has already been explained, for safety and other reasons the size of the hat and the opening thereof is very severely limited and under no circumstances can be increased. Consequently, the present invention includes means for bringing the field of view of the mirror to the lens 76 at precisely the same size, without reduction or enlargement, and to provide the effect that would exist if the lens 76 were immediately adjacent the mirror 36 and directly beneath it. This means is here shown as a unit magnification optical system, the term "unit magnification" meaning that the ratio of "magnification" is one-to-one, and that the size of the image seen through the optical system is the same as the size of the object that would be seen if the eye were viewing the object from the object end of the optical system. Such a system is formed by a pair of converging lens systems 121 and 122 (see also FIGURE 5). In the illustrated example, each of the converging lens systems 121, 122 is formed of a number of optical lenses, and is an item of standard commercial manufacture, the details of which are not here shown. In principle each could be replaced by a simple converging lens so long as the arrangement thereof and relation of the lenses one to another is as herein specified. To arrange these converging lens systems 121 and 122 to provide unit magnification, they are spaced apart so that their confronting foci are coincident with one another. In the illustrated example, the two lens systems 121 and 122 are spaced apart by means of a spacing tube 123, the tube having threaded ends that are threaded into the confronting open ends of the lens systems 121 and 122 as illustrated in FIGURE 4. At each such joint, a lock nut 124 is threaded on the spacing tube 123 so as to lock the two lens systems in precise axial spacing with respect to one another.

As an important feature of the invention, the reticle of cross-hairs 61 is mounted at the common focal plane of the two lens systems 121, 122 so that the cross-hairs appear perfectly focused in the final picture. As shown in FIGURE 5 a reticle ring 126 is mounted as by means of radially threaded bolts 127 at the midpoint of the spacing tube 123. The bolts 127 have conical tips engaging a V-groove 130 in the periphery of the ring 126. The groove 130 is slightly offset so that as the bolts 127 are tightened, the ring is forced into seating engagement with a shoulder 135 of the tube 123. A transparent plate 128 is mounted on the interior of the ring 126 bearing in one axial direction against an interior peripheral flange 129 and secured in the other axial direction by means of an interior sleeve 131 bearing, through an interpositioned resilient pad 134, against the plate 128 and secured to the ring by means of bolts 132. As shown in FIGURE 7, the crosshairs 61 are etched on the camera side of the plate 128. As shown in FIGURE 8, each crosshair line is formed as by means of a shallow etched V-groove 133, filled with titanium dioxide, which has the quality of showing as a black substance in daylight and reflecting light at night to give the effect of an illuminated line. Since the crosshairs are precisely fixed in the length of the spacing tube 123, the adjustment of the converting lenses 121 and 122 to establish their foci precisely at the plane of the crosshairs is carried out by adjusting the positions of the lens systems on the ends of the tube 123 and locking the assembly in permanent position by means of the previously described lock nuts 124.

For illuminating the crosshairs at night, as shown in FIGURES 5 and 7, there are provided a pair of electric light bulbs 136 and 137 mounted in appropriate radial bores 138 and 139 in the tube 123 and ring 126 respectively, the light bulb bases being secured as by means of bolts 141 to the tube 123. The exteriorly projecting portions of the light bulbs and the leads thereof extend through circumferentially elongated slots 142 in the outer tube 34, so that the interior assembly can be rotated when necessary with respect to the tube 34. To assist in the spread of the light from the light bulbs to cover all portions of the crosshairs, a pair of circumferentially elongated slots 143 are formed in the ring 126 and extend in both circumferential directions from the openings 139 of the ring. To mask the most intense portion of the light beams from the crosshairs so as not to cause too bright a reflection, a pair of small bar-shaped masks 144 are mounted in the ring 126 and extending in an axial direction across the radially inward ends of the openings 139. It is to be noted that the light beams are directed at substantial angles to all of the crosshair lines 61.

It has already been mentioned that the horizontal angle at which the mirror 36 views the deck may be adjusted and set as by rotating the exterior tube 34 with respect to the camera lens and sleeve 107. However in making such an adjustment, a further adjustment is needed to maintain the crosshairs 61 strictly parallel to and perpendicular to the surface of the deck, because as will be readily understood, the rotation of the exterior tube 34 alone would have the effect of rotating the crosshairs about the axis of the tube so as to tilt them as seen in the monitor 57. Accordingly, the two lens systems 121 and 122, together with spacing tube 123, and reticle 61 are arranged to be rotatable as a unit within the tube 34. Referring particularly to FIGURES 4 and 7, the lower end of the lens system 121 is shown as being supported on the upper end of the sleeve 107, and the spacing tube 123 is secured to any chosen rotational position with respect to the outer tube 34 as by means of a clamping thumb screw 151, which extends through a circumferentially elongated slot 152 formed in the outer tube 34, and is threaded into the spacing tube 123. Thus when it is desired to rotate or tilt the crosshairs to bring them to a true perpendicular and parallel relationship with the deck, the thumb screw 151 is loosened, the spacing tube 123 and the associated lens systems 121, 122 are rotated to the correct position, and the thumb screw 151 is then tightened to lock the assembly in position. Normally, therefore, the sequence of adjusting procedure would be first to adjust the outer tube 34 in rotation as by means of loosening the screw 112 and rotating the outer tube 34 until the mirror 36 is correctly aligned, then tightening the screws 112; and secondly the crosshairs are adjusted as above described.

It is also to be noted that, as previously described, the sleeve 107 is axially movable with respect to the mounting member 103 for the purpose of adjusting the vertical spacing between the lower lens 153 of the lens system 121 and the lens 76 of the camera. This adjustment is imporant in the initial setup of the apparatus, to ensure that the field of view 116 of the camera lens is subtended by nearly the full diameter of the lens 153, so that the fullest use is made of the field of view of the camera lens. This adjustment is effected as by manipulation of the ring member 104 and the setting of set screws 108 and 109 to lock the assembly in correct spacing and axial alignment.

An interior thread 154 of the ring member 104 is illustrated in FIGURE 4, but this thread is for optical rather than mechanical use. The purpose of the thread is merely to roughen the interior surface of the ring member to decrease reflection.

It has been mentioned that the crosshairs 61 are located at the common foci of the two lens systems 121 and 122, so that the hairs are permanently in focus at infinity. A further advantage resides in that the hairs thus will not appear in the camera view unless the camera lens is also correctly focused at infinity. This feature is of especial value for focusing the camera lens at night, when only the crosshairs may be visible.

The assembly of the apparatus is summarized as follows. With the camera 31 mounted on the rods 38 and in a lowered position, retracted from the deck 11, the ring 104 and sleeve 107 are mounted on the mounting member 103. The tube 34 with the lens system inside is mounted on the sleeve 107, and the ring 104 is adjusted until the lower lens 153 of the lens system subtends substantially the full field of view 116 of the camera lens 76. The set screws 108 are then tightened to lock the ring member 104 in correct axial spacing, and the set screws 109 are tightened to adjust and lock the tube 34 and optical system in correct alignment with the axis of the camera lens. The camera is then raised until the mirror 36 is within the hat 18. The collar 50 is loosened, the screws 112 are loosened, and the outer tube 34 is rotated until the mirror 36 is aligned precisely down the center line 16 of the landing strip. The screws 112 and the collar 50 are then tightened to preserve this alignment. The thumb screw 151 is then loosened and the interior tube 123 and lens system is rotated until the crosshairs 61 have a correct perpendicular and parallel alignment with the deck 11 as seen through the mirror 36; and the thumb screw 151 is then tilted.

In operation, the system control 55 is used to select the signal from one or another of the island camera 51, the forward center line camera 52 (which is similar in its structure and mounting to the aft center line camera 31) or aft camera 31 for sending to the split screen generator 56. Meanwhile the display board camera 53 is trained on the display board 54, and the signal therefrom is supplied to the split screen generator 56. The generator 56 forms a composite signal which is returned to the control 55 and is sent thence for display on the monitor 57 and recording on the recorder 71. At anytime subsequent to the actual landing operation, the composite selected signal may be played back from the recorder 71 through the system control 55 to the monitor 57. As previously explained, the control officer may have available a set of monitor tubes continuously displaying each of the signals from the island and center line cameras to aid him in his selection. Also, the monitor 57 may actually be a number of monitors arranged in electrical parallel and positioned in various locations about the landing vessel for the continuous observation of various functionaries.

It will be understood that while the above system has been described as relating to an aircraft carrier and its landing deck, the system or any part of it may equally well be used on land, the cameras for example being positioned in cavities or underground rooms constructed immediately beneath the surface of a ground-based landing field.

Thus, there has been described an apparatus constructed in accordance with the invention including a camera mounted beneath an aircraft landing surface, e.g. the deck of a carrier, the camera being trained on a mirror that is mounted in an opening of the deck and is protected by a hood or hat. The hat projects only a few inches above the deck and is shaped to cause the least possible obstruction to the wheels of an aircraft. The mirror is continuously adjusted for tilt in response to signals from the ship's gyroscope, so as to maintain a pair of crosshairs trained aft at the correct approach and landing angle despite pitch and roll of the ship. A unit magnification optical system is provided to bridge the gap between the mirror and the camera lens so as to avoid tunnel-view effects and to make fullest use of the field of view available. The crosshairs are illuminable for night use and are positioned within the optical system so as to be permanently in focus. In a preferred version, the camera is a television camera connected to one or more television monitors and to a television tape recorder for making a permanent record of the landing. Controls are provided for recording the views from several different cameras, including one trained on a board displaying contemporary weather and other information. In addition, the voices of the pilot and landing crew members may be recorded.

What is claimed is:

1. A device for monitoring the flight of an aircraft toward a landing surface element, comprising:
   a camera mounted beneath said landing surface element with the lens of said camera trained at a predetermined angle toward said element, said element being provided with an opening on the optical axis of said camera;
   a mirror mounted on said element above said opening and on said optical axis for reflecting an image of said aircraft to said camera; and
   means for transmitting said image from said mirror to said camera lens with substantially unit magnification so that the field of view of said lens, and the image thereat, are substantially the same as if the lens are mounted in the place of said mirror.

2. A device for monitoring the flight of an aircraft toward a landing surface element, comprising:
   a camera mounted beneath said landing surface element with the lens of said camera trained at a predetermined angle toward said element, said element being provided with an opening on the optical axis of said camera;
   a mirror mounted on said element above said opening and on said optical axis for reflecting an image of said aircraft to said camera; and
   means for transmitting said image from said mirror to said camera lens with substantially unit magnification so that the field of view of said lens, and the image thereat, are substantially the same as if the lens were mounted in the place of said mirror;
   said last-named means including a pair of converging lens systems positioned with the confronting foci thereof coincident with one another.

3. A device for monitoring the flight of an aircraft toward a landing surface element, comprising:
   a camera mounted beneath said landing surface element with the lens of said camera trained at a predetermined angle toward said element, said element being provided with an opening on the optical axis of said camera;

a mirror mounted on said element above said opening and on said optical axis for reflecting an image of said aircraft to said camera;

means for transmitting said image from said mirror to said camera lens with substantially unit magnification so that the field of view of said lens, and the image thereat, are substantially the same as if the lens were mounted in the place of said mirror;

said last-named means including a pair of converging lens systems positioned with the confronting foci thereof coincident with one another; and a reticle mounted at the position of said coincident foci.

4. A device for monitoring the flight of an aircraft toward a landing surface element, comprising:

a camera mounted beneath said landing surface element with the lens of said camera trained at a predetermined angle toward said element, said element being provided with an opening on the optical axis of said camera;

a mirror mounted on said element above said opening and on said optical axis for reflecting an image of said aircraft to said camera;

means for transmitting said image from said mirror to said camera lens with substantially unit magnification so that the field of view of said lens, and the image thereat, are substantially the same as if the lens were mounted in the place of said mirror;

said last-named means including a pair of converging lens systems positioned with the confronting foci thereof coincident with one another;

a reticle mounted at the position of said coincident foci; and means for laterally illuminating said reticle.

5. A device for monitoring the flight of an aircraft toward a landing surface element, comprising:

a camera mounted beneath said landing surface element with the lens of said camera trained at a predetermined angle toward said element, said element being provided with an opening on the optical axis of said camera;

a mirror mounted above said opening and on said optical axis for reflecting an image of said aircraft to said camera;

means for transmitting said image from said mirror to said camera lens with substantially unit magnification so that the field of view of said lens, and the image thereat, are substantially the same as if the lens were mounted in the place of said mirror;

said last-named means including a pair of converging lens systems positioned with the confronting foci thereof coincident with one another;

a spacing tube interposed between and axially adjustably coupled to both of said lens systems for accurately adjusting the coincidence of said foci;

a reticle element mounted in said spacing tube substantially at the position of said coincident foci; and an outer tube enclosing said spacing tube and lens systems and retaining same against axial movement, said outer tube having an extension at one end for mounting said mirror and being rotatable with respect to said spacing tube and lens systems for varying the inclination of said reticle element with respect to said mirror.

6. A device for monitoring the flight of an aircraft toward a landing surface element, comprising:

a camera mounted beneath said landing surface element with the lens of said camera trained at a predetermined angle toward said element, said element being provided with an opening on the optical axis of said camera;

a mirror mounted above said opening and on said optical axis for reflecting an image of said aircraft to said camera;

means for transmitting said image from said mirror to said camera lens with substantially unit magnification so that the field of view of said lens, and the image thereat, are substantially the same as if the lens were mounted in the place of said mirror;

said last-named means including a pair of converging lens systems positioned with the confronting foci thereof coincident with one another;

a spacing tube interposed between and axially adjustably coupled to both of said lens systems for accurately adjusting the coincidence of said foci;

a reticle element mounted in said spacing tube substantially at the position of said coincident foci; and an outer tube enclosing said spacing tube and lens systems and retaining same against axial movement, said outer tube having an extension at one end for mounting said mirror and being rotatable with respect to said spacing tube and lens systems for varying the inclination of said reticle element with respect to said mirror;

the other end of said outer tube being coupled to said camera lens so that said lens systems and said reticle element and mirror are solidly mounted thereon, said outer tube being rotatable with respect to said camera lens for varying the azimuth of said mirror in the horizontal plane.

7. A device for monitoring the flight of an aircraft toward the deck of a ship, comprising:

a camera mounted beneath said deck with the lens of said camera trained at a predetermined angle toward said deck, said deck being provided with an opening on the optical axis of said camera;

a mirror mounted on said deck above said opening and on said optical axis for reflecting an image of said aircraft to said camera; and means for transmitting said image from said mirror to said camera lens with substantially unit magnification so that the field of view of said lens, and the image thereat, are substantially the same as if the lens were mounted in the place of said mirror.

8. A self-training device for monitoring the flight of an aircraft toward the deck of a ship, comprising:

a camera mounted beneath said deck with the lens of said camera trained at a predetermined angle toward said deck, said deck being provided with an opening on the optical axis of said camera;

a mirror tiltably mounted on said deck above said opening and on said optical axis for reflecting an image of said aircraft to said camera;

means for continuously sensing the tilt of said deck with respect to the plane of the terrestrial horizon and for continuously and automatically tilting said mirror to compensate therefor and to maintain said camera trained upon said aircraft; and means for transmitting said image from said mirror to said camera lens with substantially unit magnification so that the field of view of said lens, and the image thereat, are substantially the same as if the lens were mounted in the place of said mirror.

9. A self-training device for monitoring the flight of an aircraft toward the deck of a ship, comprising:

a camera mounted beneath said deck with the lens of said camera trained at a predetermined angle toward said deck, said deck being provided with an opening on the optical axis of said camera;

a mirror tiltably mounted above said opening and on said optical axis for reflecting an image of said aircraft to said camera;

means for continuously sensing the tilt of said deck with respect to the plane of the terrestrial horizon and for continuously and automatically tilting said mirror to compensate therefor and to maintain said camera trained upon said aircraft; and means for transmitting said image from said mirror to said camera lens with substantially unit magnification so that the field of view of said lens, and the image thereat, are substantially the same as if the lens were mounted in the place of said mirror;

said last-named means including a pair of converging lens systems positioned with the confronting foci thereof coincident with one another.

10. A self-training device for monitoring the flight of an aircraft toward the deck of a ship, comprising:

a camera mounted beneath said deck with the lens of said camera trained at a predetermined angle toward said deck, said deck being provided with an opening on the optical axis of said camera;

a mirror tiltably mounted on said deck above said opening and on said optical axis for reflecting an image of said aircraft to said camera;

means for continuously sensing the tilt of said deck with respect to the plane of the terrestrial horizon and for continuously and automatically tilting said mirror to compensate therefor and to maintain said camera trained upon said aircraft; and means for transmitting said image from said mirror to said camera lens with substantially unit magnification so that the field of view of said lens, and the image threat, are substantially the same as if the lens were mounted in the place of said mirror;

said last-named means including a pair of converging lens system positioned with the confronting foci thereof coincident with one another;

a spacing tube interposed between and axially adjustably coupled to both of said lens systems for accurately adjusting the coincidence of said foci;

a reticle element mounted in said spacing tube substantially at the position of said coincident foci; and an outer tube enclosing said spacing tube and lens systems and retaining same against axial movement, said outer tube having an extension at one end for mounting said mirror and being rotatable with respect to said spacing tube and lens systems for varying the inclination of said reticle element with respect to said mirror.

11. A self-training device for monitoring the flight of an aircraft toward the deck of a ship, comprising:

a camera mounted beneath said deck with the lens of said camera trained at a predetermined angle toward said deck, said deck being provided with an opening on the optical axis of said camera;

a mirror tiltably mounted above said opening and on said optical axis for reflecting an image of said aircraft to said camera;

means for continuously sensing the tilt of said deck with respect to the plane of the terrestrial horizon and for continuously and automatically tilting said mirror to compensate therefor and to maintain said camera trained upon said aircraft;

means for transmitting said image from said mirror to said camera lens with substantially unit magnification so that the field of view of said lens, and the image thereat, are substantially the same as if the lens were mounted in the place of said mirror;

said last-named means including a pair of converging lens systems positioned with the confronting foci thereof coincident with one another;

a spacing tube interposed between and axially adjustably coupled to both of said lens systems for accurately adjusting the coincidence of said foci;

a reticle element mounted in said spacing tube substantially at the position of said coincident foci; and an outer tube enclosing said spacing tube and lens systems and retaining same against axial movement, said outer tube having an extension at one end for mounting said mirror and being rotatable with respect to said spacing tube and lens systems for varying the inclination of said reticle element with respect to said mirror;

the other end of said outer tube being coupled to said camera lens so that said lens systems and said reticle element and mirror are solidly mounted thereon, said outer tube being rotatable with respect to said camera lens for varying the azimuth of said mirror in the horizontal plane.

12. A self-training device for monitoring the flight of an aircraft toward the deck of a ship, comprising:

a camera mounted beneath said deck with the lens of said camera trained at a predetermined angle toward said deck, said deck being provided with an opening on the optical axis of said camera;

a mirror tiltably mounted above said opening and on said optical axis for reflecting an image of said aircraft to said lens system and said camera;

means for transmitting said image from said mirror to said camera lens with substantially unit magnification so that the field of view of said lens, and the image thereat, are substantially the same as if the lens were mounted in the place of said mirror;

said least-named means including a pair of converging lens systems positioned with the confronting foci thereof coincident with one another;

a spacing tube interposed between and axially adjustably coupled to both of said lens systems for accurately adjusting the coincidence of said foci;

a reticle element mounted in said spacing tube substantially at the position of said coincident foci;

an outer tube enclosing said spacing tube and lens systems and retaining same against axial movement, said outer tube having a semicylindrical extension at one end and tiltably mounting said mirror, said outer tube being rotatable with respect to said spacing tube and lens systems for varying the rotational inclination of said reticle element with respect to said mirror;

a gyroscope mounted on said ship and means coupled thereto for emitting signals continuously indicating the tilt of said deck with respect to the plane of the terrestrial horizon;

a servo motor mounted on said outer tube, said motor being coupled to said last-named means for receiving said signals therefrom and being coupled to said mirror for continuously and automatically tilting said mirror to compensate for the tilt of said deck and to maintain said camera trained upon said aircraft; and the other end of said outer tube being coupled to said camera lens so that said lens systems and said reticle element and mirror are solidly mounted thereon, said outer tube being rotatable with respect to said camera lens for varying the azimuth of said mirror in the horizontal plane.

13. A system for monitoring the approach of an aircraft toward a landing surface element, comprising:

a first camera mounted on said landing surface element with the axis of the field of view of said camera substantially coincident with the correct approach path of said aircraft;

a display board bearing information to be recorded;

a second camera trained on said display board; and means for selectively combining the images produced by said cameras to provide a composite picture including portions of both images.

14. A system for monitoring the approach of an aircraft toward a landing surface element, comprising:

a pair of first cameras mounted in spaced-apart relation on said landing surface element with the axes of the fields of view of said cameras substantially coincident with the correct approach path of said aircraft;

a display board bearing information to be recorded;

a second camera trained on said display board; and means for selectively combining the images produced by said cameras to provide a composite picture including at least part of the image of said second camera and part of the image of one of said first cameras.

15. A system for monitoring the approach of an aircraft toward a landing surface element, comprising:
   a pair of first cameras mounted in spaced-apart relation on said landing surface element with the axes of the fields of view of said cameras substantially coincident with the correct approach path of said aircraft;
   a display board bearing information to be recorded;
   a second camera trained on said display board;
   a third camera mounted on said landing surface element in laterally displaced relation to said aircraft path and trained thereon; and
   means for selectively combining the images produced by said cameras to provide a composite picture including at least part of the image of said second camera and part of the image of one of said first and third cameras.

16. A system for monitoring the approach of an aircraft toward a landing surface element, comprising:
   a pair of first cameras mounted in spaced-apart relation on said landing surface element with the axes of the fields of view of said cameras substantially coincident with the correct approach path of said aircraft;
   a display board bearing information to be recorded;
   a second camera trained on said display board;
   a third camera mounted on said landing surface element in laterally displaced relation to said aircraft path and trained thereon;
   means for selectively combining the images produced by said cameras to provide a composite picture including at least part of the image of said second camera and part of the image of one of said first and third cameras; and
   means for recording and displaying said composite picture.

17. A system for monitoring and recording the flight of an aircraft toward a landing surface element, comprising:
   a first television camera mounted beneath said landing surface element with the lens of said camera trained at a predetermined angle toward said element, said element being provided with an opening on the optical axis of said camera;
   a mirror mounted on said element above said opening and on said optical axis for reflecting an image of said aircraft to said camera;
   means for transmitting said image from said mirror to said camera lens with substantially unit magnification so that the field of view of said lens, and the image thereat, are precisely the same as if the lens were mounted in the place of said mirror;
   a display board bearing information to be recorded;
   a second television camera trained on said display board;
   a split screen generator coupled to said cameras for forming a composite television picture signal from the signals of the two cameras; and
   a magnetic tape television recorder and reproducer coupled to said split screen generator for recording said composite signal.

18. A system for monitoring and recording the flight of an aircraft toward a landing surface element, comprising:
   a first television camera mounted beneath said landing surface element with the lens of said camera trained at a predetermined angle toward said element, said element being provided with an opening on the optical axis of said camera;
   a mirror mounted on said element above said opening and on said optical axis for reflecting an image of said aircraft to said camera;
   means for transmitting said image from said mirror to said camera lens with substantially unit magnification so that the field of view of said lens, and the image thereat, are precisely the same as if the lens were mounted in the place of said mirror;
   a system control unit coupled to said first camera for receiving the signal thereof;
   a display board bearing information to be recorded;
   a second television camera trained on said display board;
   a split screen generator coupled to said second camera and to said system control unit for forming a composite television picture signal from the signals of the two cameras and returning said composite signal to said system control unit; and
   a magnetic tape television recorder and reproducer coupled to said system control unit for receiving and recording said composite signal.

19. A system for monitoring and recording the flight of an aircraft toward the landing deck of an aircraft carrier, comprising:
   a pair of centerline television cameras mounted beneath said landing deck and spaced along the centerline of said deck with the lenses of said cameras trained at predetermined angles toward said deck, said deck being provided with a pair of openings on the optical axes of said respective cameras;
   a pair of mirrors mounted on said deck respectively above said openings and on said optical axes for reflecting images of said aircraft to said cameras;
   means for transmitting said images from said mirrors to said respective camera lenses with substantially unit magnification so that the field of view of each lens, and the image thereat, is precisely the same as if the lenses were mounted in the place of the respective mirror;
   an island television camera mounted in the island structure of said aircraft carrier and trained on said deck;
   a system control unit coupled to said cameras for receiving the signals thereof and for selecting one of said signals for further processing;
   a display board bearing information to be recorded;
   a display board television camera trained on said display board;
   a split screen generator coupled to said display board camera and to said system control unit for forming a composite television picture signal from the signals of the display board camera and said selected signal, and for returning said composite signal to said system control unit; and
   a magnetic tape television recorder and reproducer coupled to said system control unit for receiving and recording said composite signal.

20. A system for monitoring and recording the flight of an aircraft toward the landing deck of an aircraft carrier, comprising:
   a pair of centerline television cameras mounted beneath said landing deck and spaced along the centerline of said deck with the lenses of said cameras trained at predetermined angles toward said deck, said deck being provided with a pair of openings on the optical axes of said respective cameras;
   a pair of mirrors mounted on said deck respectively above said openings and on said optical axes for reflecting images of said aircraft to said cameras;
   means for transmitting said images from said mirrors to said respective camera lenses with substantially unit magnification so that the field of view of each lens, and the image thereat, are precisely the same as if the lenses were mounted in the place of the respective mirror;
   an island television camera mounted in the island structure of said aircraft carrier and trained on said deck;
   a system control unit coupled to said cameras for receiving the signals thereof and for selecting one of said signals for further processing;

a display board bearing information to be recorded;
a display board television camera trained on said display board;
a split screen generator coupled to said display board camera and to said system control unit for forming a composite television picture signal from the signals of the display board camera and said selected signal, and for returning said composite signal to said system control unit;
a magnetic tape television recorder and reproducer coupled to said system control unit for receiving and recording said composite signal; and
at least one monitor television picture tube coupled to said control unit for receiving said composite signal therefrom both during the original transmission of said composite signal and during subsequent playback from said television recorder and reproducer.

No references cited.

DAVID G. REDINBAUGH, *Primary Examiner.*

H. W. BRITTON, *Assistant Examiner.*